United States Patent
Kreisfeld et al.

(10) Patent No.: US 11,524,848 B2
(45) Date of Patent: Dec. 13, 2022

(54) APPARATUS AND METHOD FOR DETERMINING THE WEAR CONDITION OF A CHAIN

(71) Applicant: iwis antriebssysteme GmbH & Co. KG, Munich (DE)

(72) Inventors: Peter Kreisfeld, Winkelhaid (DE); Florian Madlener, Fürstenfeldbruck (DE); Josef Siraky, Donaueschingen (DE); Thomas Wolf, Munich (DE)

(73) Assignee: IWIS ANTRIEBSSYSTEME GMBH & CO. KG, Munich (DE)

( * ) Notice: Subject to any disclaimer, the term of this patent is extended or adjusted under 35 U.S.C. 154(b) by 593 days.

(21) Appl. No.: 16/109,180

(22) Filed: Aug. 22, 2018

(65) Prior Publication Data
US 2019/0062068 A1   Feb. 28, 2019

(30) Foreign Application Priority Data
Aug. 23, 2017   (DE) ........................ 10 2017 119301.4

(51) Int. Cl.
| | |
|---|---|
| B65G 43/02 | (2006.01) |
| G01B 7/04 | (2006.01) |
| G01B 11/04 | (2006.01) |
| G05B 1/04 | (2006.01) |
| F16G 13/18 | (2006.01) |
| G01B 21/32 | (2006.01) |
| F16G 13/06 | (2006.01) |
| G01B 21/16 | (2006.01) |

(52) U.S. Cl.
CPC ............ *B65G 43/02* (2013.01); *F16G 13/06* (2013.01); *F16G 13/18* (2013.01); *G01B 7/046* (2013.01); *G01B 11/043* (2013.01); *G01B 21/16* (2013.01); *G01B 21/32* (2013.01); *G05B 1/04* (2013.01)

(58) Field of Classification Search
CPC ..... B65G 43/02; B65G 2207/48; F16G 13/18; G05B 1/04; G05B 11/043; G01B 21/16; G01B 21/32; G06F 19/00
USPC ..... 198/84, 810.02–810.4; 702/34, 127, 183, 702/188–189
See application file for complete search history.

(56) References Cited

U.S. PATENT DOCUMENTS

| | | | | |
|---|---|---|---|---|
| 4,274,783 A * | 6/1981 | Eineichner | ........... | G01B 11/043 198/349.95 |
| 4,657,131 A * | 4/1987 | Brychta | ................. | B65G 23/44 198/810.02 |
| 5,079,729 A * | 1/1992 | Nowakowski | ......... | G01B 11/26 144/356 |
| 5,938,554 A * | 8/1999 | Moster | .................... | F16G 13/06 474/206 |
| 6,178,824 B1 * | 1/2001 | Hayakawa | ............... | F16G 13/00 73/828 |
| 6,781,515 B2 * | 8/2004 | Kuzik | .................... | B65G 43/02 198/810.02 |

(Continued)

*Primary Examiner* — Jeffrey P Aiello
(74) *Attorney, Agent, or Firm* — Henry M. Feiereisen LLC

(57) ABSTRACT

In a method for determining the elongation of segments of a chain of a chain drive during operation, a plurality of measured values is determined at different positions of the chain. A plurality of length values is determined from the plurality of measured values and a position of the segments of the chain is determined. The length values are assigned to the segments of the chain, with the length of the segments of the chain being smaller than the length of the chain.

16 Claims, 4 Drawing Sheets

(56) References Cited

U.S. PATENT DOCUMENTS

| | | | |
|---|---|---|---|
| 7,540,374 B2 * | 6/2009 | Rathbun | B65G 43/02 198/502.1 |
| 2004/0226805 A1 * | 11/2004 | Lodge | B65G 43/02 198/810.02 |
| 2006/0064285 A1 * | 3/2006 | Schmidt | A61B 5/0452 702/189 |
| 2006/0246168 A1 * | 11/2006 | Haider | B30B 5/067 425/363 |
| 2007/0114110 A1 * | 5/2007 | Frost | G01S 5/02 198/502.3 |
| 2009/0120768 A1 * | 5/2009 | Kusel | B65G 43/02 198/810.02 |
| 2010/0025198 A1 * | 2/2010 | Wallace | B65G 15/36 198/810.02 |
| 2011/0093218 A1 * | 4/2011 | Vozner | G01B 11/14 702/34 |
| 2014/0102212 A1 * | 4/2014 | Urbanzyk | B65G 43/02 73/828 |
| 2016/0349790 A1 * | 12/2016 | Connor | G06F 1/163 |
| 2018/0370734 A1 * | 12/2018 | Ziegler | B65G 43/08 |

* cited by examiner

APPARATUS AND METHOD FOR DETERMINING THE WEAR CONDITION OF A CHAIN

CROSS-REFERENCES TO RELATED APPLICATIONS

This application claims the priority of German Patent Application, Serial No. 10 2017 119 301.4, filed Aug. 23, 2017, pursuant to 35 U.S.C. 119(a)-(d), the disclosure of which is incorporated herein by reference in its entirety as if fully set forth herein.

This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "APPARATUS AND METHOD FOR DETERMINING THE WEAR CONDITION OF A CHAIN".

BACKGROUND OF THE INVENTION

The present invention relates to a method for determining the elongation of chain segments of a chain drive, a sensor device for determining the elongation of chain segments as well as a chain and a computer program for carrying out the method.

The following discussion of related art is provided to assist the reader in understanding the advantages of the invention, and is not to be construed as an admission that this related art is prior art to this invention.

Chain drives are used in a variety of industrial applications for drive or transportation purposes. Several chain strands are often used. In addition to a circulating chain that usually runs endlessly, a complete chain drive includes several sprockets that serve to deflect the chain, as well as drive or transport elements that are connected to the chain and are activated by the chain. Due to the abrasion of parts in the chain joint that move relative to one another, a chain is subject to wear during operation. Other factors, such as chain run-in elongation, stretching, bearing play and bearing wear, can also lead to chain elongation and ultimately to failure of the drive unit. Further factors influencing chain wear are the forces acting on the chain and loads or also external influences determined by the environment. Due to the complexity of these interrelationships, it is not possible to predict chain wear and thus possible malfunctioning during operation or even failure of the drive unit.

Complex chain drives are increasingly being used due to the ever increasing number of fully automated machines and systems required for modern factory automation. Due to the high investment costs for such a high degree of automation and global pricing pressure, it is necessary to reduce machine and system downtime to an absolute minimum and to completely prevent unplanned downtime.

In addition to direct financial losses, unplanned downtime also leads to indirect problems, e.g. interruption of the logistics chain up to delivery times that cannot be met and thus to further financial losses. However, even slight wear and tear can lead to production errors due to processes synchronized by chain drives and these errors must then be readjusted manually. Since the wear of a drive chain or its elongation cannot be avoided or predetermined, continuous monitoring of a chain drive is indispensable in order to be able to carry out timely inspections for adjusting the synchronized processes and replacing defective chains.

The wear of a drive chain can be determined by measuring the force, the distance or the angle of rotation of chain tensioners or two rotary position sensors at the drive wheel and at the load wheel. However, a chain tensioner is not needed in all application scenarios and rotary position sensors cannot be used everywhere either. In addition, they are then influenced by wear or chain elongation. However, such methods must be precisely adapted to the specific process, as the measurement in these cases depends on the total chain length and also on the wear of the sprockets. Adjustments are very time consuming and error prone. Therefore, these methods are not generically applicable.

Depending on the sensors and measuring principle used, prior art approaches have many shortcomings. Conventional measuring systems with fixed distances between sensors require a drive with a constant speed for precise measurement of the chain elongation and result in measurement errors due to irregularities in the drive system, for example relative slip between the drive wheel and the drive chain or wear of the sprockets. Optical sensors, on the other hand, are not suitable for practical use in drive and transportation systems in many applications, as the industrial environmental conditions can lead to failure or incorrect measurements of the optical sensors, especially due to dust and dirt. In contrast, inductive sensors not only have a switching sensitivity in the measuring direction but also an inherent switching sensitivity perpendicular to it, so that inductive sensors have a tendency not only to vibration sensitivity but also to false measurements.

Common to all prior art approaches is that the chain elongation cannot be traced back to the elongation of individual chain segments. In the event of detected elongation, this means that the chain as a whole must always be replaced, which is associated with significantly higher costs. This additionally means that the limit values previously specified also have to take into account singularities in the chain elongation until the chain is replaced, thus requiring significantly lower limit values than if the elongation of individual chain segments or even chain links were known. Although individual apparatuses and methods already allow for the measurement of values that enable an elongation also for chain segments, these values cannot be assigned to individual chain segments considered during a measurement, so that this in turn leads to the complete replacement of the chain.

It would therefore be desirable and advantageous to address prior art problem and to obviate other prior art shortcomings.

SUMMARY OF THE INVENTION

According to one aspect of the present invention, a. method for determining an elongation of segments of a chain of a chain drive during operation includes recording a plurality of measured values at different positions of the chain, determining a plurality of length values from the plurality of measured values, determining a position of the segments of the chain, and assigning the specific length values to the segments of the chain, respectively, wherein a length of the segments of the chain is smaller than a length of the chain.

Such a method makes it possible to determine the elongation of individual chain segments and also to assign it to the respective chain segments. This means that the chain as a whole does not have to be replaced, as with previously known methods for detecting supercritical chain elongation. Furthermore, it is advantageous that the specified limit values, which indicate a critical state of the chain or individual chain segments, do not have to consider singularities in the chain elongation, thereby enabling the use of significantly higher limit values, since the singularities of actual chain elongation can be detected. Moreover, as a result of this method, it is no longer necessary to replace the entire chain if the limit value is exceeded. Rather, if the elongation of the individual chain segments or even chain links is known, only the chain segments or chain links that also demonstrate supercritical elongation need to be replaced. This not only leads to longer operational periods of the machine or system before the chain has to be serviced, the material costs for replacing the affected chain segments are also significantly lower, which is associated with considerable cost savings.

To ensure clarity, it is necessary to establish the definition of several important terms and expressions that will be used throughout this disclosure. The term chain segment relates to a chain section of a predefined length. During the process in accordance with the invention, a length value is determined for each chain segment. The chain segment can comprise one chain link but also several chain links and attachments. With regard to the attachments, it is not necessary for the chain segments to be identical.

In accordance with the present invention, the chain can be divided into a large number of segments. These segments may overlap. Advantageously, however, they border each other. In both cases, however, they provide complete coverage of at least those parts of the chain that are accessible to the sensor for position or elongation measurements. The length or number of segments depends on the chain length. Advantageously, small segments are selected, since in the case of supercritical elongation only the affected segment has to be replaced and the defined limit values for critical elongation do not have to consider averaging over a large number of chain links. At least 5 segments, preferably at least 10 segments, are distributed over the length of the chain. Currently preferred is the provision of at least 25 segments. Optionally, a length of the segments can have a maximum of 25 chain links, preferable are 10 chain links. Currently preferred is a length of the segments of 5 chain links.

According to another advantageous feature of the present invention, a number of the segments can correspond to a number of chain links of the chain which are guided past one or more sensors as the measured values are recorded during operation. This has the advantage that each individual chain link can be monitored with regard to its elongation. If critical elongation should occur in a single chain link or in only very few chain links, this elongation could remain undetected due to the averaging of the measured values over a larger range. The limit value to be set would have to take this into account and would therefore have to be much smaller, which would lead to longer machine downtime and consequently to higher costs.

According to another advantageous feature of the present invention, a measurement for recording the measured values can be continuously repeated during operation of the chain drive. For this purpose, the measurements are repeated on successive chain segments. If a circulation or run of the chain segments to be monitored has ended, monitoring is continued segment by segment with the following circulation or run. This has the advantage that the subsequent assignment of the measured values or length values can be allocated to the individual segments more easily.

During the process, the measured values of the individual segments are determined first. Length values are determined from the measured values with the aid of a control unit. These length values are compared with reference values. The reference values can be limit values stored in the control unit before measurement starts. The reference values can also be determined from a zero measurement carried out on the chain in its original state. For this purpose, it is necessary to define a maximum deviation, on the basis of which it can then be specified which measured or length values reach a corresponding error state.

A wide variety of different sensors may find application for carrying out this process. Therefore, measured values can be optical signals, magnetic signals or other signals. It is therefore possible to use a large number of sensors to carry out this process.

According to another advantageous feature of the present invention; the position of the chain segments can be specified using the measured values and/or the length values determined from the measured values. This has the advantage that no additional sensor needs to be installed and controlled to determine the position of the chain segments. This saves considerable production costs for this type of sensor device.

According to another advantageous feature of the present invention, only a selection of the measured values and/or the length values determined from the measured values can be used to specify the position of the chain segments. This has the advantage that less processor and memory capacities are needed to determine the position of the chain segments.

According to another advantageous feature of the present invention, the measured values used to determine the position of the chain segments and/or the length values determined from the measured values can be reduced. The measured values or the length values determined from the measured values can be reduced by using only a selected number of segments and/or chain links in the chain to determine the position of the chain segments. The values can optionally also be reduced by observing a continuous section of segments and/or chain links, or by a reduction in which only every second, third, fourth or x segment and/or chain link is observed.

According to another advantageous feature of the present invention, a sequence of measured values or quantities determined from the measured values, such as elongations of adjacent chain segments, can be interrelated to determine the position of the chain segments. A characteristic pattern results from the sequence of measured values or the elongations determined from the measured values. This is possible because the individual chain segments and/or the individual chain links do not elongate evenly during operation. There are chain segments and/or chain links which are either subjected to more stress than others or have different mechanical characteristics due to manufacturing tolerances, which lead to different elongation of the individual chain segments and/or the individual chain links during long-term operation. This has the advantage that there is no need for a second sensor to determine the position of the chain and for a structural change of the chain, which the second sensor can use to determine the position of the chain. The infrastructure and capacities provided for controlling and evaluating the measurement results can also be dispensed with. This significantly reduces the costs for the sensor according to the invention.

According to another advantageous feature of the present invention, the measured values and/or the length values determined from the measured values can be used to determine an adaptation function from their sequence, which is determined from a correction calculation on which a large number or all measured values and/or variables determined from the measured values are based.

According to another advantageous feature of the present invention, an output function containing trigonometric functional components and/or components of a polynomial can be selected for the adaptation function.

According to another advantageous feature of the present invention, a local significance can be determined from the measured values and/or from the variables determined from the measured values. This significance can, for example, be a local or absolute maximum or minimum of the measured values or the variables determined from the measured values. A significance can also be described as an alternative by further characteristic curve features, such as turning points.

The term "local significance" within the scope of the present invention relates to a characteristic of the chain that can be detected by a sensor. It is local because the chain position can be determined by detecting the local significance, since the sensor for determining the local significance and the sensor for determining the length values of the individual chain segments and/or chain links are arranged at a defined distance from each other. Several local significances can be arranged on one chain. This is useful when the chains are very long, when the chains are not endless chains or when a reversal of direction is to be expected during operation. In such cases, it is advantageous to be able to differentiate between the individual local significances so that a clear assignment of the determined length values to the respective chain segments is possible. This can be achieved, for example, because the local significances can be distinguished from each other by the signals they detect, or by selecting different distances between the local significances in a circulating endless chain, for example.

According to another advantageous feature of the present invention, the relative position of local significances to each other can be used to determine the position of the chain segments. The relative position can be described, for example, by the distance between two or more local significances. It is also possible to determine the distance between several pairs of local significances.

According to another advantageous feature of the present invention, the measured values and/or the quantities of individual segments and/or chain links determined from the measured values can be assigned to the chain on the basis of the local position of the determined significance. The local position describes the position of local significance in relation to the actual chain in line with this invention.

According to another advantageous feature of the present invention, the number of segments and/or chain links can also be recorded via sensors. In a circulating chain, this is done by the chain segments and/or chain links recorded by sensors between two consecutive runs of the local significance of the chain. When several structural changes to the chain are provided, the number of chain segments and/or chain links between these local significances is determined. Advantageously, the number can be determined from the number of recorded measured values. Alternatively, the number of chain segments and/or chain links can be specified and stored, for example, in the memory of the sensor device.

According to another advantageous feature of the present invention, the sensors for detecting local significance and the sensor for recording the measured values from which the length values of the chain segments and/or chain links are determined can be arranged at a fixed and known distance. Thus, a determined measured value or length value is assigned to the respective chain segment or chain link via the detected position of local significance and the number of measured values recorded after detection of local significance (is optionally equal to the passed chain segments or chain links).

According to another advantageous feature of the present invention, the elongation of the respective chain segment is determined from the measured values after the measured values have been recorded. These length values are then compared with a stored value. The stored value can be an absolute length value or the specification of a maximum permissible deviation from an initial value. The initial value can be acquired by the measurement during commissioning or it can also be preset. The length values can then be stored optionally.

According to another aspect of the present invention, a sensor device for determining an elongation of a segment of a chain includes a first sensor configured to record measurement data to determine a position of the segment of the chain, and/or a second sensor configured to record measurement data to determine a length value of the segment of the chain.

This ensures that measured values belonging to a chain segment can also be assigned to it. This is important to ensure a chain segment that is overcritically elongated can be identified and replaced if necessary. The length value of a segment is a value that allows conclusion as to whether and/or to what extent the length of the respective segment has changed in comparison to a given value or a so-called zero measurement. The term "length value" relates to both absolute and relative values.

According to one advantageous feature of the present invention, the first and second sensors can be identical. This has the advantage that only one sensor is required to acquire both pieces of information. This saves costs compared to a solution with two sensors. In a further design according to the invention, the sensor for recording measurement data to determine the elongation of a chain segment and/or the sensor for recording measurement data to determine the position of a chain segment is either a sensor for measuring the electrical and/or magnetic properties of the chain or the reluctance, an imaging sensor or an optical sensor.

According to one advantageous feature of the present invention, provision can be made for a control unit configured to control at least one of the first and second sensors and to record and process the measurement data captured by the first sensor to determine an elongation of the segment of the chain and/or the measurement data captured by the second sensor. The control unit assigns the length values determined from the measurement data to the corresponding chain segment. The length values of the respective chain segment of the chain and/or the position of the respective chain segment within the chain can then be determined from the measurement data.

According to another advantageous feature of the present invention, the local significance can involve a structural change of the chain. The local significance indicates a single chain segment and/or chain link compared to a multitude of other chain segments and/or chain links located in the direct vicinity of the marked single chain segment or chain link. Advantageously, the chain can include several local significances.

According to one advantageous feature of the present invention, the local significance can be a strap fixed to a chain link. Other types of attachment are also conceivable. Optionally, the local significance can also be formed by a local change of a physical property of the chain. This can, for example, be a change of the magnetic field by a permanent magnet fixed to a chain segment. Local significances are subject to the sole condition that they must be detectable by a sensor.

According to still another aspect of the present invention, a computer program for executing a method to record and process measurement data of a sensor device for chain monitoring is embodied in a non-transitory computer readable medium and includes program instruction for controlling a sensor for acquiring measurement data to determine length values of segments of a chain, program instruction for controlling a sensor for acquiring measurement data to determine a position of a segment of the chain, program instruction for determining the position of the segments of the chain, and program instruction for assigning specific length values to the segments of the chain, respectively.

According to another advantageous feature of the present invention, the computer program can include program instruction for comparing the length values determined from the measured values with a previously stored comparison value. This reference value is a length value which, when reached or exceeded, no longer guarantees proper functionality of the chain. This comparison value is either determined by a separate measurement and/or stored in the control unit in which the computer program is executed.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2b is a graphical illustration of signals of the two sensor units of FIG. 2a;

DETAILED DESCRIPTION OF PREFERRED EMBODIMENTS

Figure 1:
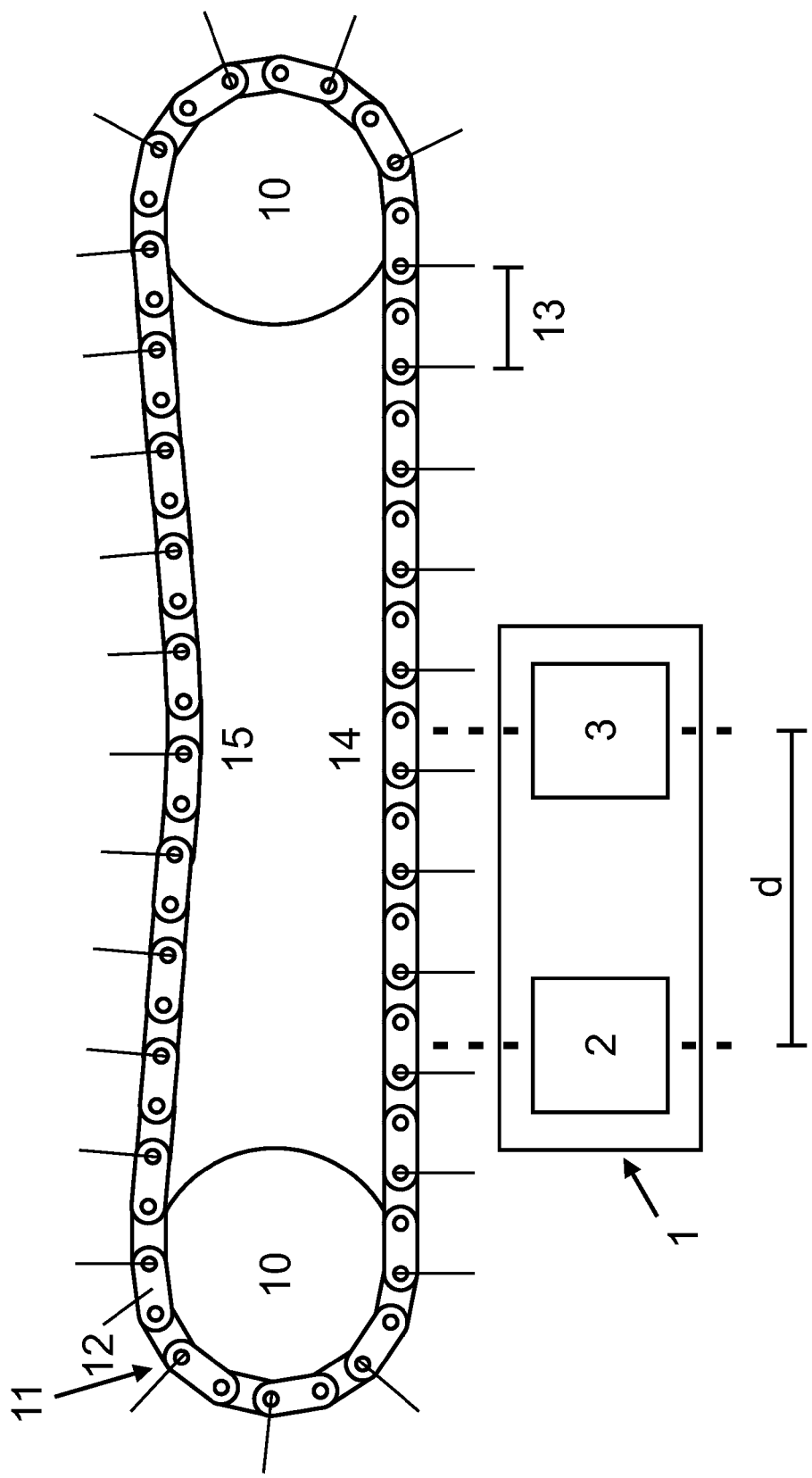
FIG. 1 is a schematic illustration of a sensor device with two sensor units for monitoring a closed chain drive in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic illustration of a sensor device, generally designated by reference numeral 1 and including two inductive proximity sensors 2, 3, which are arranged close to a closed chain 11. Chain 11 is guided around two sprockets 10 and has a large number of chain links 12. Three chain links 12 each form a chain segment 13. Sensor device 1 is located on the side of the load run 14 and opposite the side of the empty run 15. The distance d between the two inductive proximity sensors 2, 3 is selected such that n+1/3 chain links 12 are located between the two sensors 2, 3.

$$d = n*g + f \tag{1}$$

Here n describes the number of chain links 12 between the first sensor 2 and the second sensor 3 and g the length of a chain link. In this design example, f=1/3 was selected. When sensor device 1 is mounted on the load run 14, not only the elongation due to wear is measured but also the elongation due to load. In contrast, when sensor device 1 is mounted on the empty run 15, only the elongation due to wear is measured.

Figure 2A:
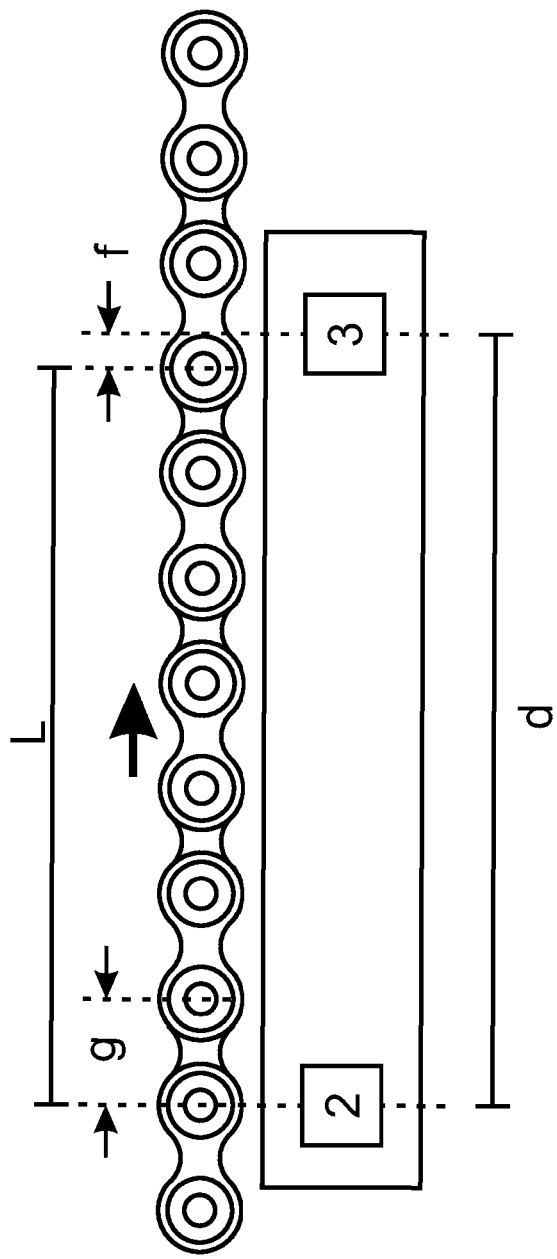
FIG. 2a is a schematic illustration of a sensor device with two sensor units for monitoring a chain running past the sensor device.
Figure 2B:
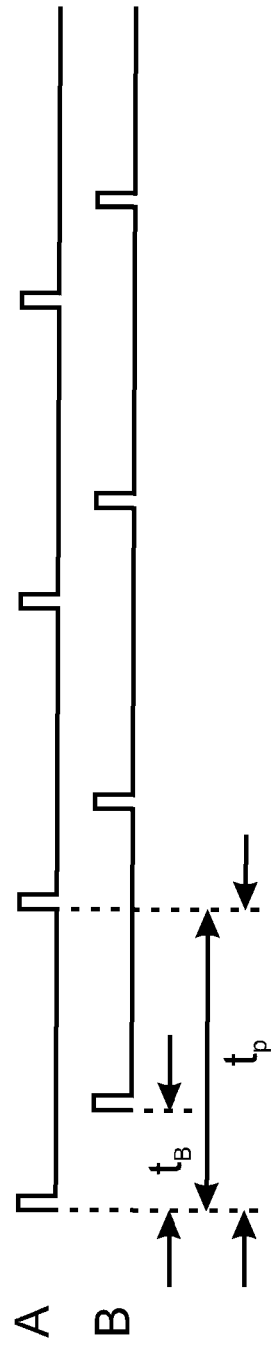

FIG. 2a shows a sensor device 1 with two sensor units 2, 3 for monitoring a chain 11 running past sensor device 1. The length of a chain link 12 is indicated here by g and f is the partial length of a chain link 12 by whose amount the second sensor 3 is displaced by an integer multiple of the chain link length g compared to the first sensor 2. In FIG. 2b the signals A, B of sensors 2, 3 are shown. The chain link length g is proportional to the time tp between two consecutive signals of one of sensors 2, 3 and f is proportional to the time between two consecutive signals of the first sensor 2 and the second sensor 3. When the chain is elongated, the clockwise direction of movement $f_r$ or $t_{Br}$ becomes smaller, and the anticlockwise direction of movement $f_l$ or $t_{sl}$ becomes larger. The phase length of the frequencies of signals A and B of sensors 2, 3 is measured by measuring $t_B$ and $t_p$. The ratio $t_B/(t_p*(n+t_B))$ in accordance with $$L/d = t_B/(t_p*(n+t_B)) \tag{2}$$

is the speed-independent relation between chain segment length L and the sensor distance d. It is important that the sensor distance for a new chain 11 is selected so that f<0.5*g. It is assumed that the chain 11 does not undergo an elongation greater than the length g of a half chain link 12 within the selected sensor spacing d.

Figure 3A:
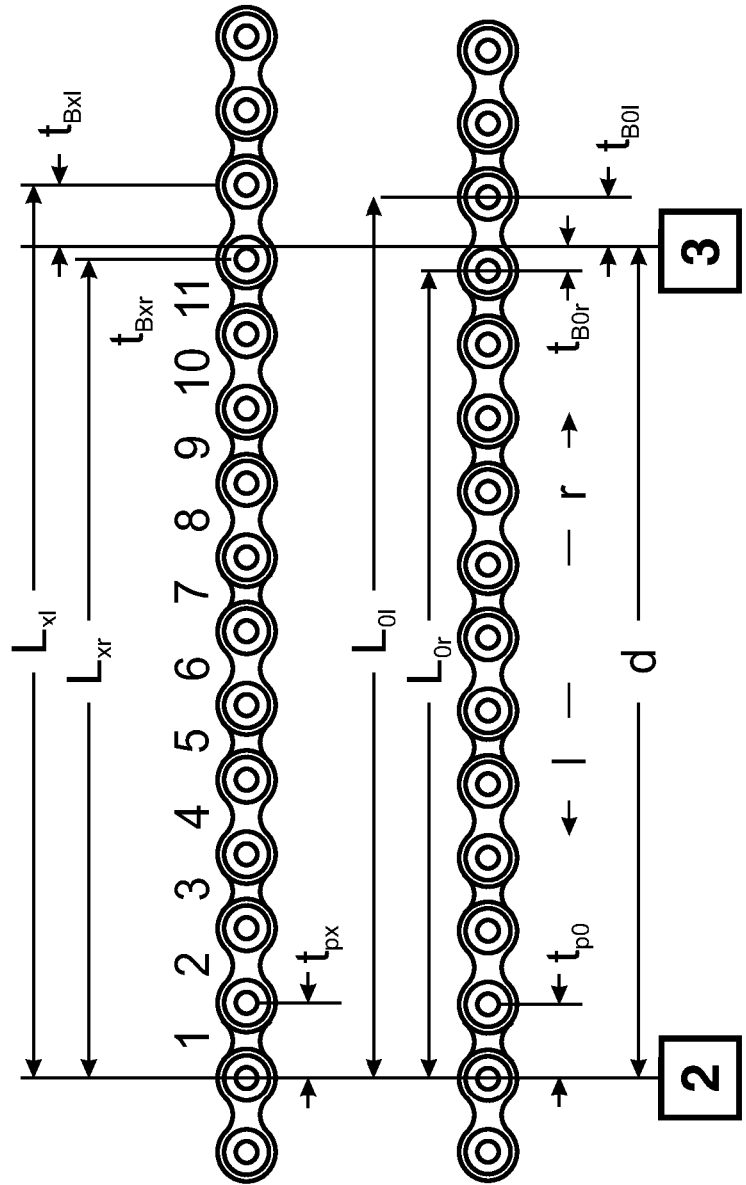
FIG. 3a is a schematic illustration of a sensor device with two sensor units for monitoring a chain running past the sensor device in anticlockwise and clockwise rotation.

FIG. 3a shows the conditions when the direction of chain travel changes from clockwise r to anticlockwise l. FIG. 3 b) shows the respective signals for clockwise and anticlockwise travel of chain 11. The ratio of the change in length ΔL of chain segment 13 to chain segment length in initial state $L_0$ results from the following equation (3):

$$\Delta L/L_0 = (L_x - L_0)/L_0 = L_x/L_0 - 1 \tag{3}$$

With Lx as the length of chain segment 13 at the time of measurement. For clockwise circulating chain 11, length Lxr of chain segment 13 results from $$L_{xr}/d = n + t_{pxr}/(n + t_{pxr} + t_{Bxr}) \tag{4},$$

wherein $t_{pxr}$ is the time interval between two successive signals A, B of one of sensors 2, 3 of clockwise circulating chain 11 in loaded state and $t_{Bxr}$ is the time interval between the signal A of the first sensor 2 and the next following signal B of sensor 3 of the clockwise circulating chain 11 in loaded state. Length $L_{0r}$ of chain segment 13 in initial state $L_{0r}$ is obtained from $$L_{0r}/d = n + t_{p0r}/(n + t_{p0r} + t_{B0r}) \tag{5},$$

wherein $t_{pxr}$ is the time interval between two successive signals A, B of one of sensors 2, 3 of clockwise circulating chain 11 in loaded state and $t_{Bxr}$ is the time interval between the signal A of the first sensor 2 and the next following signal B of sensor 3 of clockwise circulating chain 11 in initial state of chain 11.

According to equation (3), the ratio of the change in length $\Delta L_r$ to output length $L_{0r}$ of chain segment 13 for clockwise circulating chain 11 results from $$\Delta L_r/L_{0r}=(t_{B0r}/t_{p0r}-t_{Bxr}/t_{pxr})/(n+t_{Bxr}/t_{pxr}) \quad (6).$$

For clockwise circulating chain 11, length $L_{xi}$ of chain segment 13 results from $$L_{xi}/d=(n+1)+t_{pxi}/((n+1)+t_{pxi}+t_{Bxi}) \quad (7),$$

wherein $t_{pxi}$ is the time interval between two successive signals A, B of one of sensors 2, 3 of the anticlockwise circulating chain 11 in loaded state and $t_{Bxi}$ is the time interval between the signal A of the first sensor 2 and the next following signal B of sensor 3 of the anticlockwise circulating chain 11 in loaded state. Length $L_{0r}$ of chain segment 13 in initial state $L_{0l}$ is obtained for anticlockwise circulating chain 11 from $$L_{0l}/d=(n+1)+t_{p0l}/((n+1)+t_{p0l}+t_{Bpl}) \quad (8).$$

— According to equation (3), the ratio of the change in length $\Delta L_r$ to output length $L_{0r}$ of chain segment 13 is obtained for anticlockwise circulating chain 11 from $$\Delta L_r/L_{0l}=(t_{Bxi}/t_{pxi}-t_{B0l})/((n+1)-t_{Bxi}/t_{pxl}) \quad (9).$$

Figure 3B:
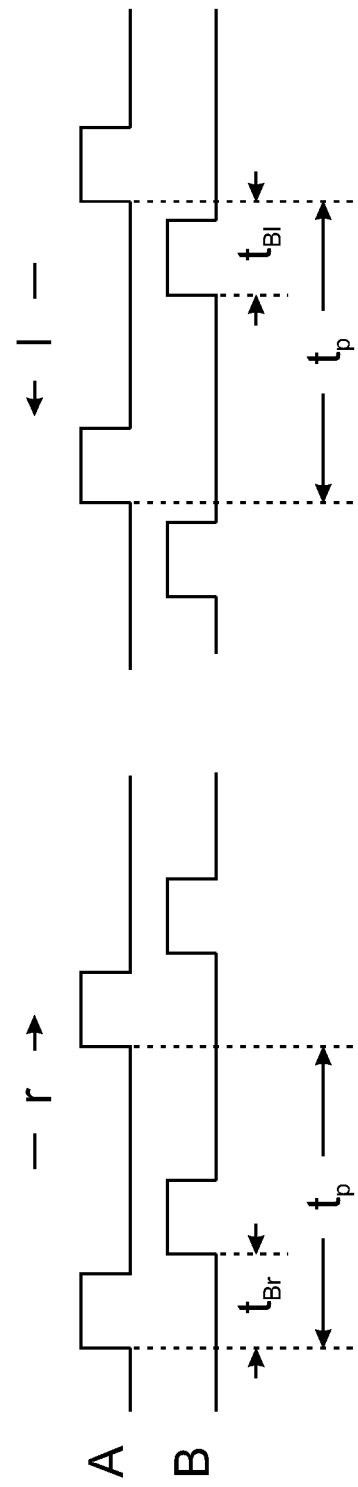
FIG. 3b is a graphical illustration of signals of the two sensor units of FIG. 3a for the chain passing in anticlockwise and clockwise rotation.

FIG. 3b shows the signals A and B of sensors 2 and 3 for a clockwise circulating chain 11 and for an anticlockwise circulating chain 11. In this design example, f=1/3 was selected. For clockwise circulating chain 11, $t_B/t_{pr}$=0.33. If chain 11 runs in reverse, the value jumps to $t_B/t_{pi}$=1−0.33=0.67. The direction of the chain movement can thus be clearly determined and ambiguities for the ratio $t_B/t_p$ are excluded. Consequently, the distance between sensors 2 and 3 must be selected so that f is ≠0 and f is ≠0.5, For a ratio $t_B/t_p$<0.5, equation (6) is used to calculate the elongation of chain 11. If the ratio $t_B/t_p$>0.5, the elongation of chain 11 is calculated from equation (9). The operating conditions for the sensor device are such that the sensor distance must not be so large that chain 11 in the section between the sensors is not elongated more than $\Delta L$=f*g. At f=0.25*g, this corresponds to a maximum elongation $\Delta L_{max}$ of $\Delta L_{max}$=0.25 for 10 chain links 12 and a maximum elongation $\Delta L_{max}$ of $\Delta L_{max}$=2.5% for 100 chain links 12.

Figure 4C:
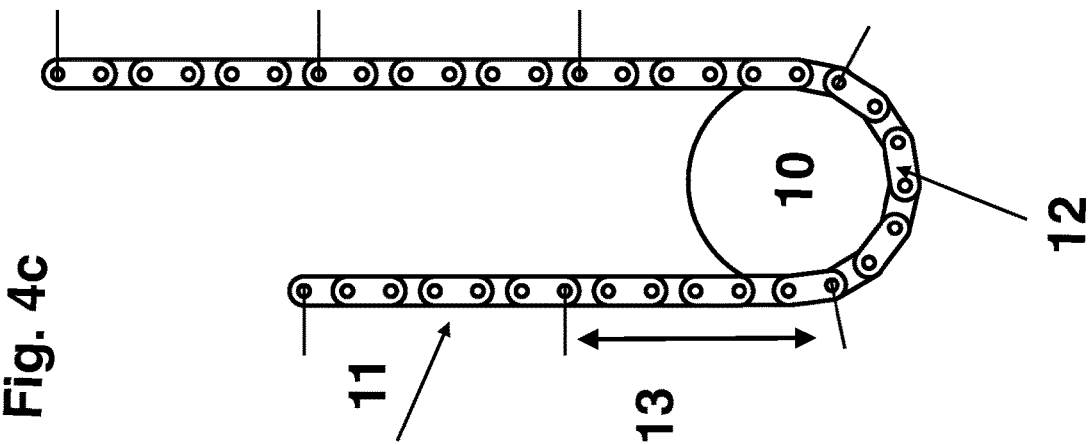
FIG. 4c is a schematic illustration of a chain with chain segments with the length of six chain link.
Figure 4B:
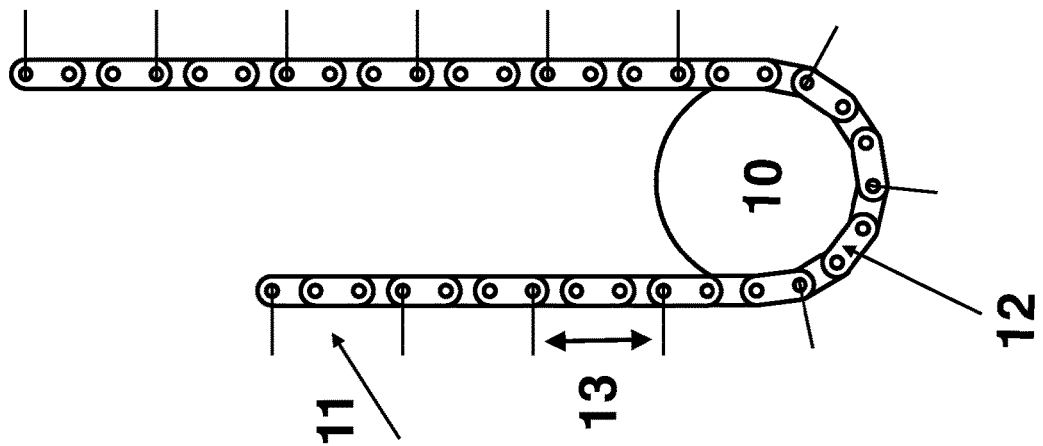
FIG. 4b is a schematic illustration of a chain with chain segments with the length of three chain link.
Figure 4A:
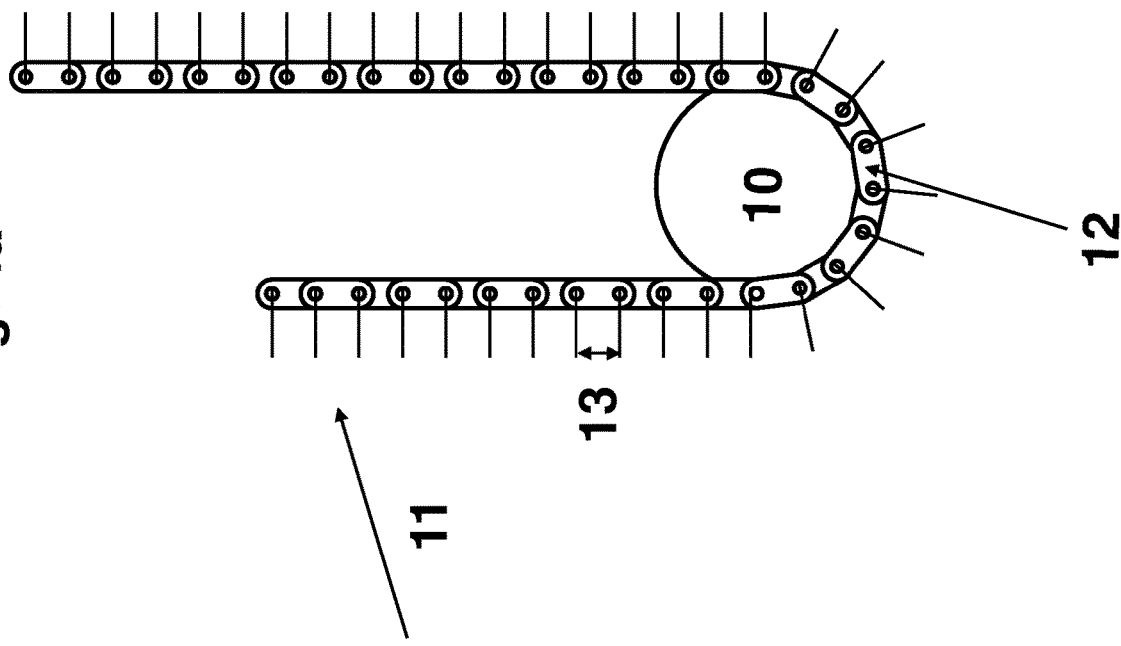
FIG. 4a is a schematic illustration of a chain with chain segments with the length of one chain link.

In FIGS. 4a to 4c, chains 12 with chain segments of varying lengths are shown. For the chain in FIG. 4a, the length of a chain segment $L_s$ at $L_s$=g. The chain in FIG. 4b shows a chain 11 with a chain segment length $L_s$ of $L_s$=3*g, while in FIG. 4c a chain with a chain segment length $L_s$ with $L_s$=6*g is shown.

An endless conveyor chain 11 with 7020 chain links 12 (16B chain according to ISO 606) used in food production is divided into 390 chain sections (design example 1). A chain section comprises 18 chain links 12, whereby each of the 18 links has a conveying strap arranged on chain 11, i.e. a chain section comprises 18 chain links 12 and a conveying strap. Chain links 12 have a length of g=2.54 cm according to ISO 606. To detect the position of chain 11, a magnet is fixed on the outer strap as a local significance. Alternatively, the magnet could also be arranged on the plug-in strap. To detect the change in length of chain segments 13 during operation of chain 11, a chain condition monitoring controlled (CCM controlled) sensor device 1 based on reluctance sensors was arranged in the immediate vicinity of chain 11. The position of chain 11 is also monitored by means of a Hall sensor 2, 3. This is connected via the controller to a display on which the position of the defective chain segment 13 is displayed in case of a corresponding measurement result. During monitoring, measured values are recorded for all chain links 12 with regard to their change in length. At a chain speed of 0.1-0.2 m/s, this results in a time interval of 0.15-0.25 s between two consecutive measurements. For this purpose, the change in length of chain segments 13 in comparison to the initial length of chain links 12 is determined in %. To determine the position of chain 11, a performance map of the individual graduations is created and continuously updated. Subsequently, chain 11 must be counted manually or the machine moves to the affected chain link 12 with an appropriate control routine. A marking on the chain is used to assign the measured values to the individual chain links 12. During the measurement, each chain link passing sensors 2, 3 is measured. The values determined are compared with a reference value. The reference value is stored in the CCM memory. Alternatively, the reference value can also be transmitted wirelessly via the CCM monitor or via I/O link to the programmable logic controller (PLC).

In a second design example, an endless chain applied in food production is used as in design example 1 described above. In contrast to design example 1 described above, only 390 measuring positions per chain circulation are provided here—one per chain section, whereby the chain section comprises 18 chain links and a conveying strap. Such a chain section corresponds to exactly one chain segment here. As a result, the change in length is not determined here for each chain link 12 as described above but only for the 390 chain segments 13. At a chain speed of 0.1-0.2 m/s, this results in a time interval of 2.3-4.5 s between two consecutive measurements. When detecting a critical length value for one of these chain segments 13, only chain segment 13 with 18 chain links 12 and one conveying strap must be replaced. It is advisable to select the length of chain segment 12 so that it comprises the same elements regardless of its position in chain 11. This ensures that there is a high degree of identical parts when selecting the required spare parts, which makes servicing much easier, as no knowledge of the type of defective component is required.

In another application example (design example 3), an endless chain 11 with 3150 chain links 12 is used. This is a chain 11 of type 10B-1 according to ISO 606. In initial state, the chain links 12 have a length of 15.875 mm (nominal pitch). Each outer link is provided with a gripper element. A chain segment length of two chain links 12 is provided for wear monitoring. The number of chain segments 13 is therefore 1575. A magnet is arranged on an outer strap to determine the chain position. Alternatively, the magnet could also be arranged on the plug-in strap. To determine the length values of the chain segments 13, a CCM-controlled sensor device 1 on the basis of reluctance sensors 2, 3 is used, which detects the position of the outer strap of the chain equipped with the magnet to the CCM-controlled sensor device 1 via a Hall sensor 2, 3. During monitoring of chain 11, all measured values for each chain link 12 are recorded. At a chain speed of 0.6-0.8 m/s, this results in a time interval of 0.2-0.3 s between two consecutive measurements. For this purpose, the change in length of chain segments 13 in comparison to the initial length of chain links 12 is determined in %. The nominal pitch is specified according to ISO 606 and stored as a reference value. To determine the position of chain 11, a performance map of the individual pitches is created and continuously updated. Subsequently, chain 11 must be counted manually or the machine moves to the affected chain link 12 with an appropriate program. The assignment of the length values to the individual chain links 12 is made via the direction of movement of chain 11 and the number of determined length values after the magnet attached to the outer strap has passed through Hall sensor 2, 3.

The fourth application example describes a chain 11 for a lifting application with change of rotational direction. Unlike the previous examples, this is not an endless chain 11. The 20B-2 chain 11 has chain links 12 with a nominal pitch (length of a chain link 12) of 31.75 mm in accordance with ISO 606 231. The length of chain segment 13 is also 31.75 mm, since a length value is assigned to each chain link 12. A magnet is arranged on an outer strap to determine the position of chain link 12 marked by the magnet in relation to sensor 2, 3 to detect the length values. The length values are detected by a CCM-controlled reluctance sensor device and the position of chain 11 to the CCM-controlled reluctance sensor device 1 via the detection of the magnet by a Hall sensor 2, 3. For each chain link 12 passing through the CCM-controlled reluctance sensor device 1, a measured value is recorded from which the current length or the percentage deviation of the length of the respective chain link 12 from the nominal pitch is determined. To determine the position of chain 11, a performance map of the individual pitches is created and continuously updated. At an average chain speed of 0.6 m/s, one measurement value is recorded every 0.05 s.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for determining an elongation of segments of a chain of a chain drive during operation, said method comprising:
    recording a plurality of measured values at different positions of the chain with a first sensor and a second sensor arranged at a defined distance from each other;
    determining a plurality of length values of the segments of the chain from the plurality of measured values based on the defined distance, a time interval between two successive signals of one of the first and second sensors, and a time interval between a signal of the first sensor and a next following signal of the second sensor;
    determining a position of the segments of the chain;
    assigning the plurality of determined length values to the segments of the chain, respectively,
    wherein a length of the segments of the chain is smaller than a length of the chain;
    monitoring segments of the chain;
    identifying elongated segments of the chain by comparing the plurality of length values with stored values; and
    replacing only the identified critically elongated segments of the chain.

2. The method of claim 1, wherein at least 5 of the segments are distributed over the length of the chain.

3. The method of claim 1, wherein a number of the segments corresponds to a number of chain links of the chain which are guided past one or more sensors as the measured values are recorded during operation.

4. The method of claim 1, wherein the position of the segments of the chain is determined from the measured values and/or the length values determined from the measured values.

5. The method of claim 1, wherein the position of the segments of the chain is determined from a selection of the measured values and/or the length values determined from the measured values.

6. The method of claim 1, further comprising reducing a number of the measured values and/or the length values determined from the measured values to determine the position of the segments of the chain.

7. The method of claim 1, further comprising interrelating a sequence of measured values or elongations of segments of a chain determined from the measured values to determine the position of the segments of the chain.

8. The method of claim 1, further comprising using the measured values and/or the length values determined from the measured values to determine an adaptation function and the position of the segments of the chain.

9. The method of claim 8, wherein the adaptation function includes a component of an exponential function, a trigonometric function or a polynomial.

10. The method of claim 1, further comprising a local significance from the measured values and/or from the length values determined from the measured values.

11. The method of claim 10, wherein the local significance is a characteristic feature of the measured values and/or the length values determined from the measured values, such as local or absolute maximum or minimum or a turning point of the measured values, or of the length values determined from the measured values or of the adaptation function determined from the measured values and/or the length values determined from the measured values.

12. The method of claim 10, wherein the position of the segments of the chain is determined from the relative position of local significances to one another.

13. A sensor device for determining an elongation of a segment of a chain, said sensor device comprising:
    a first sensor configured to record measurement data to determine a position of the segment of the chain, and/or
    a second sensor arranged at a defined distance from the first sensor, said second sensor configured to record measurement data to determine a length value of the segment of the chain,
    said sensor device further comprising a control unit configured to control at least one of the first and second sensors and to record and process the measurement data captured by the first sensor to determine an elongation of the segment of the chain and/or the measurement data captured by the second sensor based on the defined distance, a time interval between two successive signals of one of the first and second sensors, and a time interval between a signal of the first sensor and a next following signal of the second sensor.

14. The sensor device of claim 13, wherein the first and second sensors are identical.

15. A computer program for executing a method for acquiring and processing measurement data of a sensor device, said computer program embodied in a non-transitory computer readable medium and comprising:

program instruction for controlling a first sensor for acquiring measurement data to determine length values of segments of a chain;

program instruction for controlling a second sensor for acquiring measurement data to determine a position of a segment of the chain;

program instruction for determining the position of the segments of the chain;

program instruction for determining the length values based on a defined distance between the first sensor and the second sensor, a time interval between two successive signals of one of the first and second sensors, and a time interval between a signal of the first sensor and a net following signal of the second sensor;

program instruction for assigning the determined length values to the segments of the chain, respectively;

program instruction for monitoring segments of the chain; and program instruction for identifying elongated segments of the chain that need to be replaced by comparing the determined length values with stored values.

16. The computer program of claim 15, wherein the first and second sensors are identical.

* * * * *